(12) United States Patent
Hasegawa et al.

(10) Patent No.: US 9,294,928 B2
(45) Date of Patent: Mar. 22, 2016

(54) WIRELESS COMMUNICATION SYSTEM

(75) Inventors: Keigo Hasegawa, Kodaira (JP); Takashi Yano, Kokubunji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 2 days.

(21) Appl. No.: 14/344,161

(22) PCT Filed: Sep. 3, 2012

(86) PCT No.: PCT/JP2012/072346
§ 371 (c)(1),
(2), (4) Date: Mar. 11, 2014

(87) PCT Pub. No.: WO2013/042529
PCT Pub. Date: Mar. 28, 2013

(65) Prior Publication Data
US 2014/0348124 A1    Nov. 27, 2014

(30) Foreign Application Priority Data
Sep. 20, 2011   (JP) ................. 2011-204345

(51) Int. Cl.
*H04W 16/14* (2009.01)
*B61L 3/12* (2006.01)
*H04B 1/7143* (2011.01)
*H04W 4/04* (2009.01)
(Continued)

(52) U.S. Cl.
CPC ............... *H04W 16/14* (2013.01); *B61L 3/125* (2013.01); *H04B 1/7143* (2013.01); *H04W 4/04* (2013.01); *H04W 72/082* (2013.01); *H04B 2201/71346* (2013.01); *H04B 2201/71384* (2013.01); *H04W 4/046* (2013.01); *H04W 72/042* (2013.01); *H04W 72/0453* (2013.01); *H04W 84/005* (2013.01)

(58) Field of Classification Search
CPC ............................ H04B 1/713–1/7156; H04B 2201/713–2201/71392; H04B 2001/71367; H04W 4/04; H04W 16/14; H04W 72/082; H04W 72/0453; H04W 84/005; H04W 72/042; B61L 3/125; H04L 5/0012
USPC ......... 370/329; 375/E1.033–E1.037, 132–138
See application file for complete search history.

(56) References Cited

U.S. PATENT DOCUMENTS

2002/0122461 A1*   9/2002   Hervey et al. ................. 375/132
2005/0020271 A1*   1/2005   Fukuda et al. ................ 455/447
(Continued)

FOREIGN PATENT DOCUMENTS

| JP | 2000-101481 A | 4/2000 |
| JP | 2009-171078 A | 7/2009 |
| JP | 2009-225135 A | 10/2009 |

OTHER PUBLICATIONS

International Search Report for PCT/JP2012/072346 (English and Japanese), ISA/JP, (2 pages), mailed Oct. 2, 2012.

*Primary Examiner* — Mark Rinehart
*Assistant Examiner* — Kenneth P Hunt
(74) *Attorney, Agent, or Firm* — Harness, Dickey & Pierce, PLC

(57) ABSTRACT

In a wireless communication system, an APM provides sequential numbers to channels formed by dividing a specific frequency band, selects the channels in bit-reversed order of the numbers to divide the channels in frequency groups, creates a small hopping table for each frequency group, and generates a hopping table using the plurality of small hopping tables, and an AP performs channel access to a STA by frequency hopping with reference to the hopping table.

11 Claims, 5 Drawing Sheets

SCHEMATIC DIAGRAM OF EMBODIMENT

(51) Int. Cl.
*H04W 72/08* (2009.01)
*H04W 72/04* (2009.01)
*H04W 84/00* (2009.01)

(56) References Cited

U.S. PATENT DOCUMENTS

2005/0078737 A1* 4/2005 Craig et al. .................. 375/132
2006/0072649 A1* 4/2006 Chang .................... H04B 1/713
  375/132
2007/0237254 A1* 10/2007 Pi ............................ H04B 7/12
  375/267
2008/0204801 A1* 8/2008 Kunii ............................ 358/1.15
2009/0180436 A1* 7/2009 Vujcic ............... H04W 74/0866
  370/330
2009/0279587 A1* 11/2009 Eriksson et al. .............. 375/133

* cited by examiner

SCHEMATIC DIAGRAM OF EMBODIMENT

CONFIGURATION BLOCK DIAGRAM OF AP AND STA

CHANNEL ALLOCATION DIAGRAM OF CBTC SYSTEM

OPERATION TIMING CHART OF CBTC SYSTEM

FIG.5

BIT REVERSE ORDER

| i | BIT REVERSE MAP | CHANNEL NUMBER |
|---|---|---|
| 0 | 0 | 1 |
| 1 | 8 | 9 |
| 2 | 4 | 5 |
| 3 | 12 | 13 |
| 4 | 2 | 3 |
| 5 | 10 | 11 |
| 6 | 6 | 7 |
| 7 | 14 | 15 |
| 8 | 1 | 2 |
| 9 | 9 | 10 |
| 10 | 5 | 6 |
| 11 | 13 | 14 |
| 12 | 3 | 4 |
| 13 | 11 | 12 |
| 14 | 7 | 8 |
| 15 | 15 | 16 |

BIT REVERSE MAP

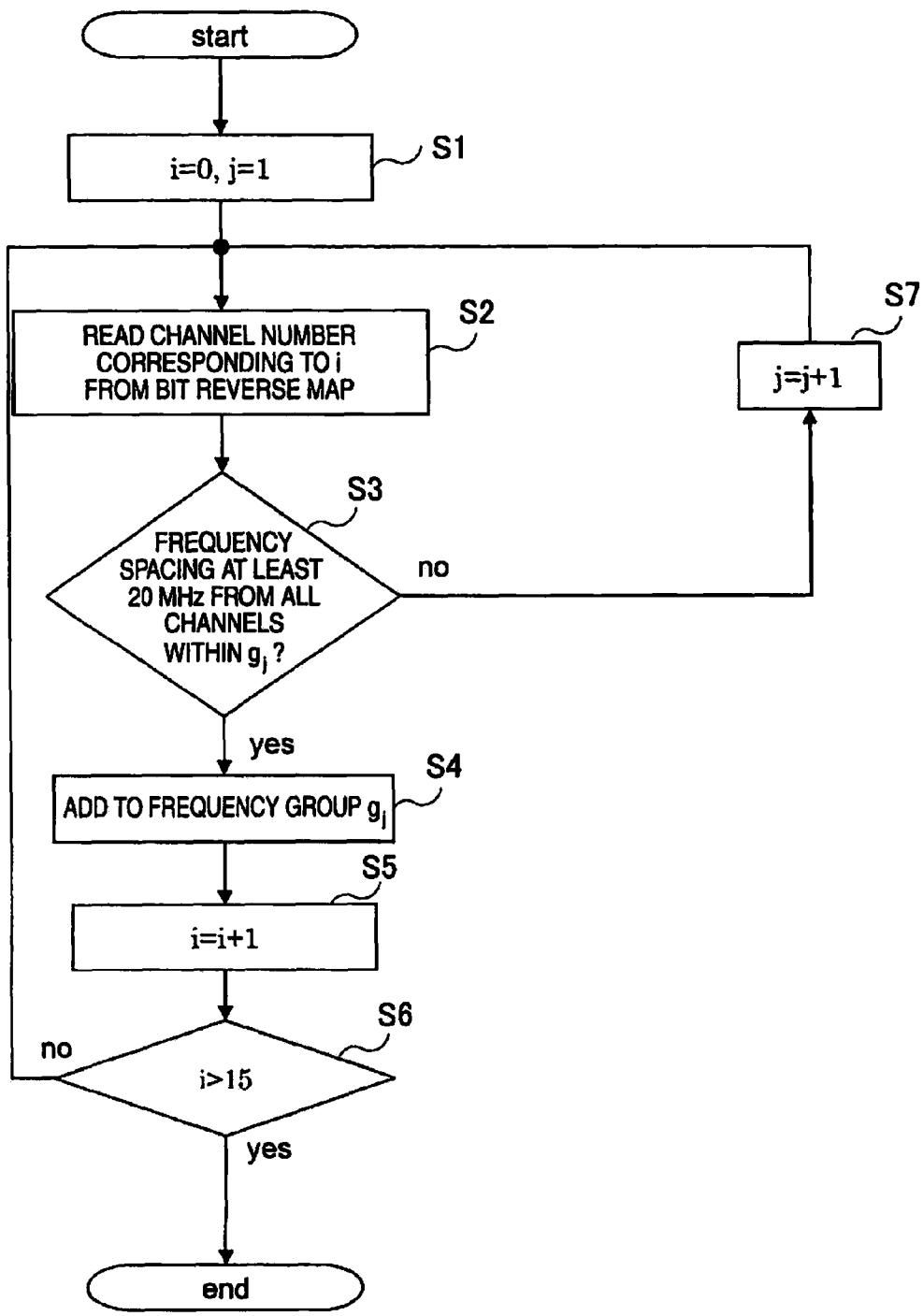

WIRELESS COMMUNICATION SYSTEM

CROSS-REFERENCE TO RELATED APPLICATIONS

This application is a 371 U.S. National Stage of International Application No. PCT/JP2012/072346, filed Sep. 3, 2012, which claims priority to Japanese Patent Application No. 2011-204345, filed Sep. 20, 2011. The disclosures of the above applications are incorporated herein by reference.

TECHNICAL FIELD

The present invention relates to wireless communication systems, and in particular, relates to the wireless communication system that selects a frequency channel that is less affected by intra-system interference, inter-system interference, interference from a wireless LAN (Local Area Network) system, and the like in wireless communication between a mobile station and a base station.

BACKGROUND ART

1. Conventional Arts

In recent years, utilization of a wireless communication system using a 2.4 GHz band that is a bandwidth available without a license is expanding.

The 2.4 GHz band is referred to an ISM (Industry-Science-Medical) band, and is used for various kinds of industrial equipment and medical instruments other than systems compliant with standards of wireless systems, such as a wireless LAN of the IEEE 802.11 system, Bluetooth (registered trademark), and Zigbee (registered trademark).

Other than these, there is a CBTC (Communication Based Train Control) system that is a railroad signaling system, as one of the wireless communication systems using the 2.4 GHz band.

The railroad signaling system is designed on fail-safe basis, wherein the railroad signaling system controls so as to be on a safe side even if any failure occurs to the system, and is a key system for assuring a safe operation of trains.

Since the railroad signaling system has an important function in railroad transportation, a transport failure due to stoppage of the system has an extraordinary effect on the society. Therefore, there is a need for a wireless communication system that guarantees high reliability (high operating rate).

However, in order to achieve reliable communication in the wireless system using the 2.4 GHz band, particularly the following four interferences need to be taken into consideration.

The first one is the interference from a wireless LAN (WLAN) or the like, the second one is the interference to other system, such as a WLAN, the third one is the interference due to a plurality of base stations (AP's) using the same frequency channel (referred to as intra-system interference), and the fourth one is the interference occurring between a plurality of adjacent CBTC systems (referred to as inter-system interference) for example when there are a plurality of tracks (railways) running in parallel.

With regard to the first interference, taking into consideration recent proliferation of the wireless LAN, a number of interferences may occur and thus particularly a countermeasure needs to be taken.

From the above, it is not easy to achieve reliable communication in the CBTC system using the 2.4 GHz band in which there are a number of interferences.

2. Related Arts

The related arts include JP-A-2009-225135, "METHOD FOR SELECTING FREQUENCY CHANNEL IN TRAIN RADIO COMMUNICATION SYSTEM AND ON-BOARD RADIO TERMINAL" (Patent Literature 1), Hitachi, Ltd., and JP-A-2009-171078, "RADIO COMMUNICATION SYSTEM, BASE STATION, AND FREQUENCY CHANNEL SELECTION METHOD" (Patent Literature 2), Hitachi, Ltd.

Patent Literature 1 describes that communication with a base station (AP: Access Point) installed along a track of a train is performed using mobile stations (STA: Station) installed in front and at the back of a train set.

STA performs channel search based on a pilot signal from the AP to hand over, thereby realizing seamless communication.

Transmission between AP and STA shall be repeated twice (referred to as "continuous transmission"), thereby achieving time diversity. Moreover, a different frequency channel is used for each AP and furthermore frequency hopping is performed wherein a frequency channel is changed every time transmission is performed, thereby achieved frequency diversity as well.

Furthermore, STA of an identical train set shall send identical train control information, thereby achieving space diversity. With the time diversity, frequency diversity, and space diversity described above, reliable communication is realized.

Patent Literature 2 proposes a frequency hopping method based on Patent Literature 1.

In Patent Literature 2, first and second hopping tables are used for frequency hopping. Basically, the frequency hopping is performed according to the first hopping table, but when the communication quality of a frequency channel corresponding to a phase indicated from an AP master (APM), which is a centralized control apparatus of an AP, is poor, this AP determines a frequency channel to use, according to the second hopping table. Thus, the utilization of a frequency channel having a number of interferences and poor communication quality is avoided.

However, during the next transmission, the first hopping table shall be used again, and whether or not the second hopping table is used is determined again based on the communication quality.

CITATION LIST

Patent Literature

[Patent Literature 1] JP-A-2009-225135
[Patent Literature 2] JP-A-2009-171078

SUMMARY OF INVENTION

Technical Problem

However, the conventional wireless communication system, particularly the frequency hopping method of Patent Literature 2, has the following three problems.

[First Problem]

As the first problem, in Patent Literature 2 the second frequency table is always used when communication quality is poor, but actually the communication quality of a changed frequency channel may be poorer, and therefore a frequency channel having better communication quality should be used. However, a frequency channel having better communication quality cannot be selected, and there is therefore a problem that good communication quality cannot be obtained.

[Second Problem]

As the second problem, the tables illustrated in Patent Literature 2 do not fully take into consideration the interference to wireless LAN's, and therefore there are cases where adjacent AP's employ channels of similar frequencies as a result of changing the table, thus causing the problem of interference to wireless LAN.

Moreover, in this case, there is possibility of interference problem from other wireless LAN as well.

Therefore, sufficient frequency diversity cannot be obtained and rather the characteristics may degrade. Accordingly, there is a need to guarantee that channels which adjacent AP's use are sufficiently spacing from each other even when a frequency channel is changed.

[Third Problem]

As the third problem, Patent Literature 2 does not take into consideration the inter-system interference, and therefore when a plurality of CBTC systems are adjacent to each other, there is a problem that the inter-system interference may occur.

The present invention has been made in view of the above-described circumstances and provides a high quality wireless communication system capable of avoiding intra-system interference, inter-system interference, and interference from a wireless LAN.

Solution to Problem

According to the present invention for solving the above-described problems of the conventional examples, there is provided a wireless communication system comprising: a plurality of base stations; a mobile station moving within a communication area of the base station; and a base station control unit controlling the base station, wherein the base station and the mobile station perform continuous transmission wherein transmission of identical information is repeated multiple times, wherein the base station stores a hopping table for generating a hopping pattern into a storage unit and performs channel access by frequency hopping with respect to the mobile station using this hopping table, wherein the base station control unit provides sequential numbers to channels formed by dividing a specific frequency band, selects the channels in a bit-reversed order of the numbers and divides the same into frequency groups, creates a small hopping table for each frequency group, generates a hopping table using the plurality of small hopping tables, and transmits this hopping table to the base station.

According to an aspect of the present invention, in the above-described wireless communication system, when there is only the wireless communication system itself and no other adjacent system, the base station control unit generates a hopping table by connecting a plurality of small hopping tables.

According to an aspect of the present invention, in the above-described wireless communication system, when there are a plurality of wireless communication systems adjacent to each other and their phases are in synchronization with each other, the base station control unit generates a plurality of hopping tables by cyclically shifting a plurality of small hopping tables, and uses different tables among the plurality of systems.

According to an aspect of the present invention, in the above-described wireless communication system, when there are two wireless communication systems adjacent to each other and their phases are not in synchronization with each other, the base station control unit generates a first hopping table by connecting a half of a plurality of small hopping tables, generates a second hopping table by connecting the rest half of the hopping tables, and uses different tables among the two systems.

According to an aspect of the present invention, in the above-described wireless communication system, when there are at least three wireless communication systems adjacent to each other and their phases are not in synchronization with each other, the base station control unit generates at least three hopping tables by selecting different small hopping tables from among a plurality of small hopping tables, and uses different tables among at least three systems.

According to an aspect of the present invention, in the above-described wireless communication system, the base station selects a frequency channel based on information on communication quality, with reference to a stored hopping table.

According to an aspect of the present invention, there is provided a mobile station used in a wireless communication system in which a base station performs channel access by frequency hopping, the mobile station receiving a signal that is subjected to frequency hopping for each slot by continuous transmission wherein identical information is repeatedly transmitted twice through two slots, and transmitting its own information to a base station in a frequency channel in accordance with a hopping table stored in a storage unit, wherein a relevant hopping table is generated by providing sequential numbers to channels formed by dividing a specific frequency band, selecting the channels in a bit-reversed order of the numbers and dividing the same into frequency groups, creating a small hopping table for each frequency group, and using the plurality of small hopping tables.

Advantageous Effects of Invention

According to the present invention, a wireless communication system comprises: a base station; a mobile station; and a base station control unit, wherein the base station and the mobile station perform continuous transmission wherein transmission of identical information is repeated multiple times, wherein the base station stores a hopping table for generating a hopping pattern into a storage unit, and performs channel access by frequency hopping with respect to the mobile station using a relevant hopping table, and wherein the base station control unit provides sequential numbers to channels formed by dividing a specific frequency band, selects the channels in a bit-reversed order of the numbers and divides the same into frequency groups, creates a small hopping table for each frequency group, generates a hopping table using the plurality of small hopping tables, and transmits this hopping table to the base station. Therefore, there are effects of avoiding interference and achieving high quality wireless communication.

BRIEF DESCRIPTION OF DRAWINGS

FIG. 5 is a view showing a bit reverse map.

FIG. 6 is a flow chart of a process of sorting frequency groups in a bit-reversed order.

DESCRIPTION OF EMBODIMENTS

Figure 1:
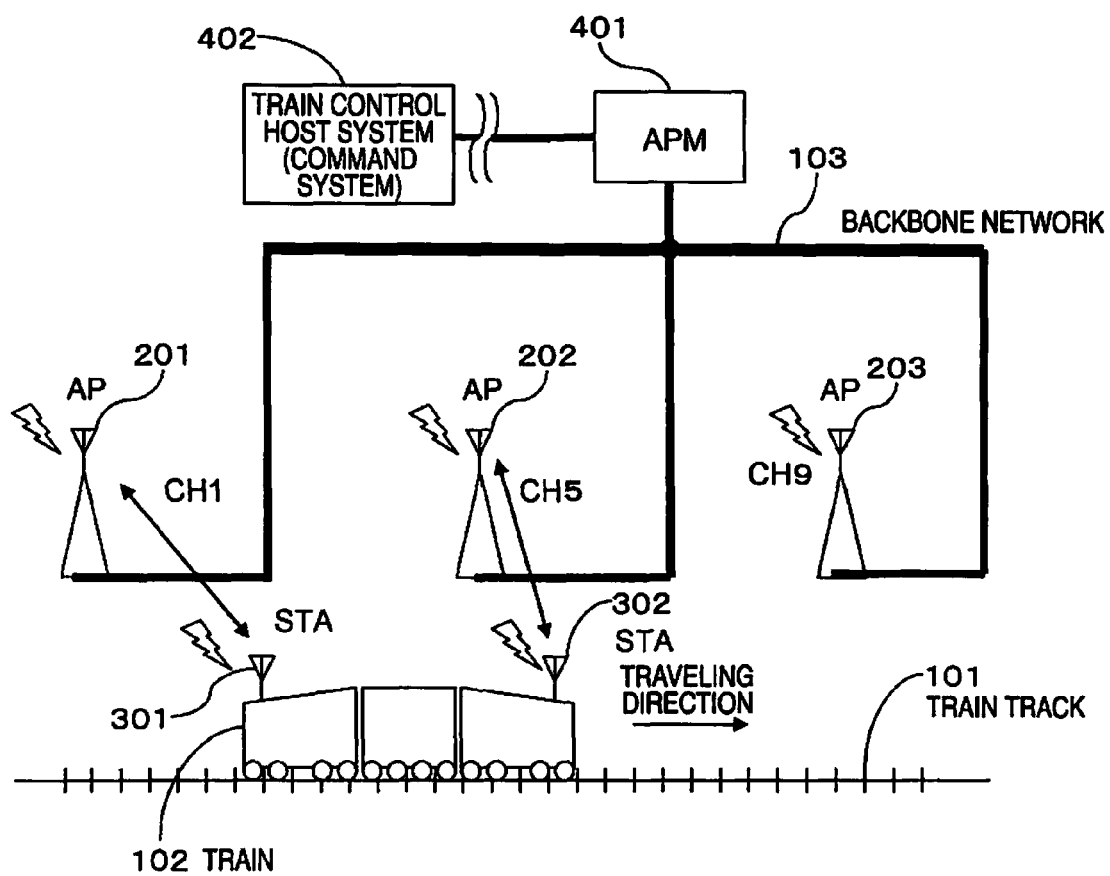
FIG. 1 is a schematic diagram of a wireless communication system according to an embodiment of the present invention.

An embodiment of the present invention will be described with reference to the accompanying drawings.

Summary of Embodiment

According to the embodiment of the present invention, a wireless communication system comprises: a base station; a mobile station; and a base station control unit, wherein the base station and the mobile station perform continuous transmission wherein transmission of identical information is repeated multiple times, wherein the base station performs channel access by frequency hopping with respect to a mobile station using a hopping table for generating a hopping pattern, and wherein the base station control unit provides sequential numbers to channels formed by dividing a specific frequency band, selects the channels in a bit-reversed order of the numbers and divides the same into frequency groups, creates a small hopping table for each frequency group, generates a hopping table using the plurality of small hopping tables, and transmits this hopping table to the base station. Therefore, the wireless communication system can avoid intra-system interference, inter-system interference, and interference from a wireless LAN and achieve high quality wireless communication.

Next, the characteristics of the wireless communication system according to the embodiment of the present invention are described.

In a CBTC system using a plurality of frequency channels provided in a 2.4 GHz band, the plurality of frequency channels are first divided into frequency groups so that a combination of any two channels spaces from each other by at least 20 MHz.

Note that, the reason why a combination of any two channels spacing from each other by at least 20 MHz are set is for avoiding interference by selecting either one channel within a group taking into consideration the bandwidth of a wireless LAN of the IEEE 802.11 system. Accordingly, when avoiding interference by paying attention to a wireless system except the IEEE 802.11 system, a combination of two frequency channels spacing from each other by the bandwidth of this wireless system are created.

Then, for each frequency group, a small hopping table having the following four characteristics is created.

[First Characteristic]

A plurality of channels are allocated to each element of the hopping table. However, among a plurality of allocated frequency channels, any two channels are always spacing from each other by at least 20 MHz. Note that, the reason why any two channels are set spacing from each other by at least 20 MHz is for avoiding interference taking into consideration the bandwidth of a wireless LAN of the IEEE 802.11 system. Accordingly, when avoiding interference by paying attention to wireless systems except the IEEE 802.11 system, the bandwidth of this wireless system is set to a frequency interval.

[Second Characteristic]

Each frequency channel is allocated only once for each hopping pattern.

[Third Characteristic]

When any frequency channel is selected from one phase of a hopping pattern and from the next phase, respectively, these frequency channels are always spacing from each other by at least 20 MHz. Note that, the reason why these frequency channels are set spacing from each other by at least 20 MHz is for avoiding interference taking into consideration the bandwidth of a wireless LAN of the IEEE 802.11 system. Accordingly, when avoiding interference by paying attention to a wireless system except the IEEE 802.11 system, the bandwidth of this wireless system is set to a frequency interval.

[Fourth Characteristic]

When at any phase of hopping patterns allocated to adjacent AP's (base stations) any frequency channel is selected from the respective patterns, these frequency channels are always spacing from each other by at least 20 MHz. Note that, the reason why these frequency channels are set spacing from each other by at least 20 MHz is for avoiding interference taking into consideration the bandwidth of a wireless LAN of the IEEE 802.11 system. Accordingly, when avoiding interference by paying attention to a wireless system except the IEEE 802.11 system, the bandwidth of this wireless system is set to the frequency interval.

One hopping table is formed by arranging small hopping tables, which are created for each group and have the above-described characteristics, in a phase direction.

At this time, in the case where there are a plurality of adjacent systems and their phases are in synchronization with each other, all the systems shall use all the frequency groups and between the respective systems the phases shall be cyclically shifted in the unit of group. In the case where there are a plurality of adjacent systems and their phases are not in synchronization with each other, frequency groups shall be equally distributed across the respective systems so as not to use an identical frequency group.

Based on the hopping tables created in this manner, a hopping pattern which each AP uses is allocated.

A frequency channel which each AP uses is determined in accordance with a phase indicated from an APM (AP master). Each AP uses a frequency channel having the best communication quality from among a plurality of frequency channels corresponding to the phase indicated by the APM.

Moreover, in the case of a nearly equal communication quality, a frequency channel least frequently used in the history may be used.

The criteria of communication quality may be a history of bit error rate, a history of packet error rate, a history of SINR (Signal to Interference and Noise power Ratio), an instant interference power by carrier sensing, or the like.

Furthermore, in the continuous transmission wherein transmission of identical information is repeated twice using two slots, if the system did not succeed in transmission even once, then in the next continuous transmission a frequency channel may be used having the largest frequency interval from a frequency channel that was used in the last continuous transmission.

Alternatively, in certain continuous transmission, if the system did not succeed in transmission even once, then in the next continuous transmission, a channel spacing at least 20 MHz from a frequency channel that was used last may be used with a higher priority.

[Wireless Communication System: FIG. 1]

The wireless communication system according to the embodiment of the present invention will be described with reference to FIG. 1. FIG. 1 is a schematic diagram of the wireless communication system according to the embodiment of the present invention.

The wireless communication system (this wireless communication system) according to the embodiment of the present invention, as shown in FIG. 1, basically includes: base stations (AP: Access Point) 201, 202, and 203 installed along a track 101; mobile stations (STA: Station) 301 and 302 that are on-vehicle radio stations of a train 102; a centralized control apparatus (APM: Access Point Master) 401 of AP; a train control host system (command system) 402; and a backbone network 103 that is a network for connecting AP 201 to 203, APM 401, and the host system.

Note that this wireless communication system is assumed to be a CBTC system.

[Each Unit of Wireless Communication System]

The base stations (AP) 201, 202 and 203 are performing wireless communication using different channels so as not to interfere between adjacent AP's.

For example, in a certain specific time slot, AP 201 uses a channel CH1, AP 202 uses a channel CH5, and AP 203 uses a channel CH9 to perform wireless communication with STA 301 and 302, respectively.

Moreover, for example, in another time slot, AP 201 uses a channel CH9, AP 202 uses a channel CH13, and AP 203 uses a channel CH5 to perform wireless communication with STA 301 and 302, respectively.

STA 301 and 302 move on a train track 101 in a travelling direction along with a train 102, and sequentially hand over to AP 201, 202 and 203 while performing channel search, thereby achieving seamless wireless communication.

Here, one STA is provided in front and at the back of the train 102, respectively, wherein each STA serves as a separate device.

APM 401 plays a role as a gateway between AP 201, 202, and 203 and the host system 402, transmits control information on the train 102, which is sent from the host system 402, to STA 301 and 302 via AP 201, 202, and 203, transmits positional information on the train 102 and the like, which are sent from STA 301 and 302 via AP 201, 202, and 203, to the host system 402, and thus plays a role as a relay between the host system 402 and STA 301 and 302.

Moreover, APM 401 controls the transmission timing of each AP and the phase synchronization of frequency hopping, wherein APM 401 instructs each AP 201, 202, and 203 to transmit/receive, thereby causing each AP 201, 202, and 203 to transmit/receive.

Figure 2:
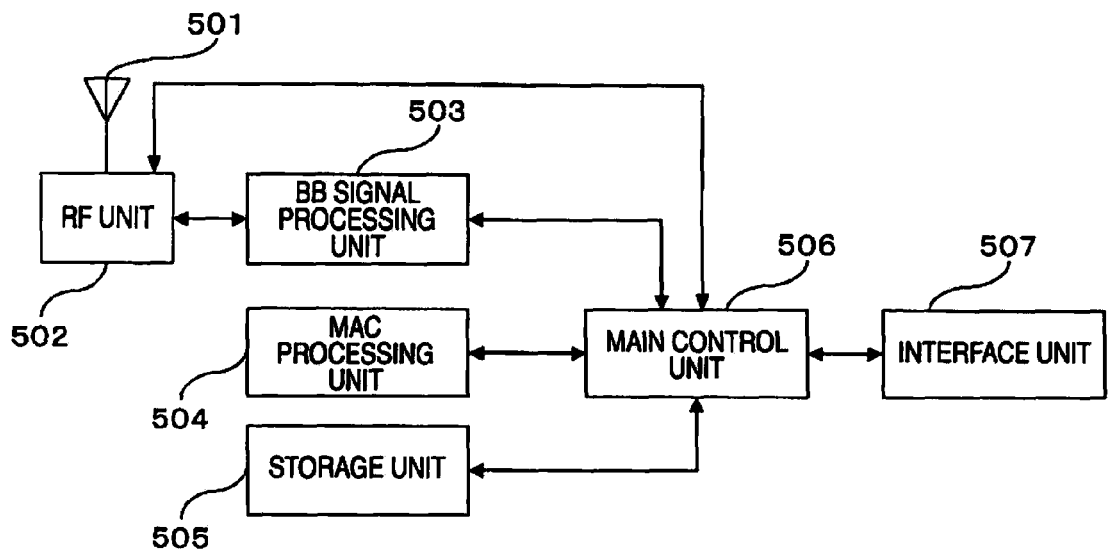
FIG. 2 is a configuration block diagram of a wireless communication device of an AP and an STA.

[AP and STA: FIG. 2]

The configuration of AP and STA in this wireless communication system will be described with reference to FIG. 2. FIG. 2 is a configuration block diagram of a wireless communication device of AP and STA.

The wireless communication device of AP and STA, as illustrated in FIG. 2, has a wireless transmission/reception function, and includes an antenna 501, a RF (Radio Frequency) unit 502, a BB (Base Band) signal processing unit 503, a MAC (Media Access Control) processing unit 504, a storage unit 505, and a main control unit 506, and an interface unit 507.

[Each Unit of Wireless Communication Device]

Each unit of the wireless communication device of AP and STA is specifically described.

The antenna 501 has a function to interface between space and the wireless device during transmission/reception.

The RF (Radio Frequency) unit 502 is a wireless unit, and has a function to convert a baseband signal to a radio frequency band during transmission, a function to convert the radio frequency band to the baseband signal during reception, and the like.

The RF unit 502 measures an SINR and an instant interference power, and outputs the information to the main control unit 506.

The BB (baseband) signal processing unit 503 has a function to add a pilot signal, error-correction encode, and baseband-modulate during transmission, a function to synchronization-process by detecting a pilot signal, error-correction decode, and baseband-modulate during reception, and the like.

Note that, the BB signal processing unit 503 may have a function to measure the SINR and the instant interference power, and measure the SINR and the instant interference power in place of the RF unit 502.

The MAC (Media Access Control) processing unit 504 has a function to determine a frequency channel that is used during transmission/reception, a function to control timings during transmission/reception, a function to add an identification ID (identifier) of a wireless device to a packet during transmission, a function to identify a transmitting wireless device during reception, and the like.

The storage unit 505 stores a hopping table and information on the communication quality of each frequency channel. The information on the communication quality is input as information on the SINR and instant interference power from the main control unit 506.

Then, the embodiment is characterized in generating the hopping table.

The main control unit 506 controls the whole wireless device.

In particular, the main control unit 506 receives information on the SINR and instant interference power from the RF unit 502, causes the storage unit 505 to store the information on communication quality, and outputs to the RF unit 502 an instruction of which channel to be used for generating a radio wave, with reference to a hopping table.

The interface unit 507 performs input/output processing of data to wirelessly transmit.

Figure 3:
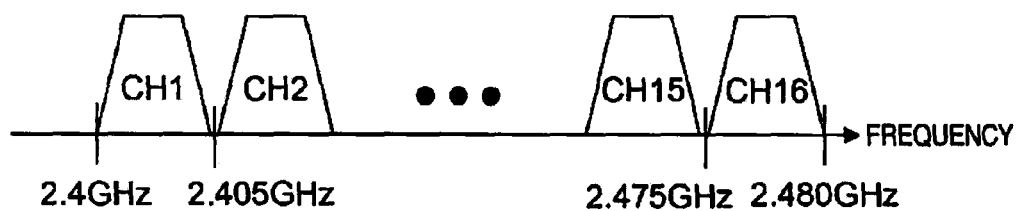
FIG. 3 is a view illustrating channel allocation of a CBTC system.

[Channel Allocation of CBTC system: FIG. 3]

Next, channel allocation in the CBTC system will be described with reference to FIG. 3. FIG. 3 is a view illustrating channel allocation of the CBTC system.

In this wireless communication system, as shown in FIG. 3, a range from 2.400 GHz to 2.480 GHz is divided into 16 channels, wherein a bandwidth of 5 MHz is allocated for each one frequency channel, and channel numbers are allocated in an ascending order from a channel of lower frequency, such as CH1, CH2, CH3, CH4, CH5, CH6, CH7, CH8, CH9, CH10, CH11, CH12, CH13, CH14, CH15, and CH16.

Figure 4:
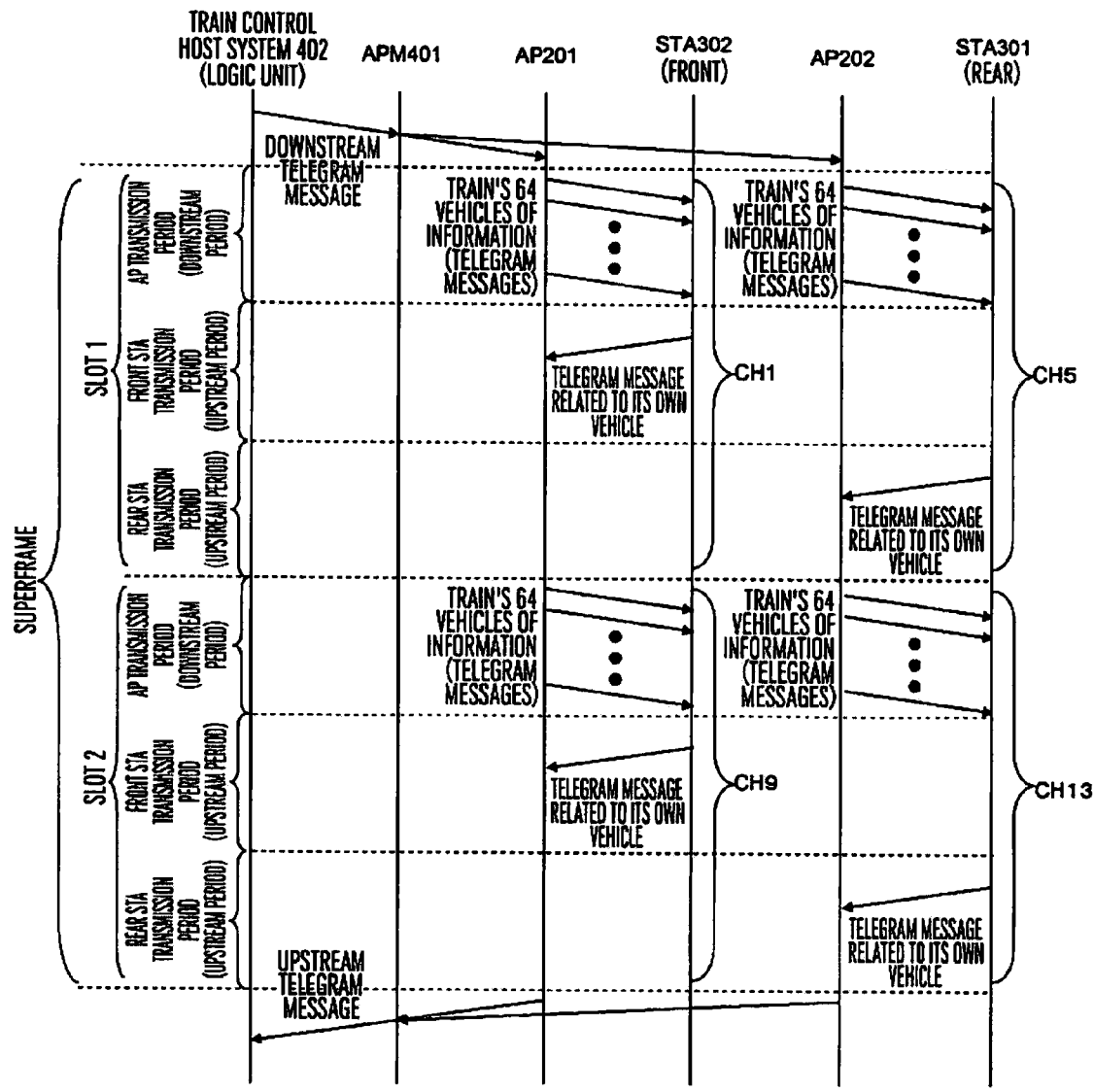
FIG. 4 is an operation timing chart of the CBTC system.

[Operation of this Wireless Communication System: FIG. 4]

Next, the operation of this wireless communication system will be described with reference to FIG. 4. FIG. 4 is an operation timing chart of the CBTC system. FIG. 4 illustrates an operation example of communication among the host system 402, AP 201 and 202, and STA 301 and 302.

In the example of FIG. 4, AP 201 and STA 302 as well as AP 202 and STA 301 communicate with each other, respectively.

[Superframe]

As illustrated in FIG. 4, for the communication between AP and STA, a superframe is used as one unit.

The superframe comprises two slots (Slot 1 and Slot 2), wherein transmission of identical information is repeated twice in two slots. With such continuous transmission, a time diversity effect can be obtained. Moreover, a frequency diversity effect can be also obtained because frequency hopping is performed for each slot. Furthermore, STA 302 in front of the train and STA 301 at the back of the train are exchange identical information, and thus a space diversity effect can be also obtained.

In Slot 1, CH1 is allocated for communication between AP 201 and STA 302, while CH5 is allocated for communication between AP 202 and STA 301.

Moreover, in Slot 2, CH9 is allocated for communication between AP 201 and STA 302, while CH 13 is allocated for communication between AP 202 and STA 301.

Each slot is divided into an AP transmission period (downlink period), a front STA transmission period, and a rear STA transmission period.

In the AP transmission period, train's 64 vehicles of information (telegram messages) are sequentially transmitted from AP in a time division manner in the form of broadcast.

In each STA transmission period, each STA transmits information about its own vehicle at a predetermined transmission timing for each vehicle. However, the transmission timing for each vehicle may be determined in accordance with an instruction from APM 401. With such a method, communications between AP and the respective STA's will not interfere with each other.

[Hopping Table of Frequency Hopping]

Hereinafter, an example of creating a hopping table that is used to generate a hopping pattern of frequency hopping is described.

Note that the hopping table may be generated by APM 401 or may be generated by the host system 402.

Then, the generated hopping table is transmitted to AP and is stored into the storage unit of AP. Moreover, a hopping table may be transmitted from AP to STA so that STA can use the hopping table.

In this wireless communication system, under the condition that for a total of 16 channels from CH1 to CH16 there is at least 20 MHz interval between any two channels within a frequency group, frequency channels are divided into frequency groups, a small hopping table is created for each frequency group, and a hopping table is created by connecting small hopping tables.

[Procedure for Creating Frequency Groups: FIG. 5]

First, a procedure for creating frequency groups is described. Frequency channels are selected in a bit-reversed order and divided into frequency groups. Specifically, the frequency groups are created according to a procedure illustrated in FIG. 5. FIG. 5 is a view illustrating a bit reverse map.

In setting channel numbers by bit-reversing, the i-th number is expressed with a binary number of 4 bits, the order of the 4 bits is reversed, the resulting 4 bits are converted into a decimal number to obtain a "bit-reversed order", and furthermore "1" is added thereto to obtain a "channel number".

For example, in the case of i=1, 4 bits of a binary number are "0001", the order of the 4 bits is reversed to obtain "1000", the resulting 4 bits are converted into a decimal number to obtain "8" of the "bit-reversed order", and "1" is added thereto to obtain "9" of the "channel number".

Moreover, in the case of i=2, 4 bits of a binary number are "0010", the order of the 4 bits is reversed to obtain "0100", the resulting 4 bits are converted into a decimal number to obtain "4" of the "bit-reversed order", and "1" is added thereto to obtain "5" of the "channel number".

In this manner, the channel numbers by bit-reversing are set.

Based on the bit reverse map of FIG. 5, the channel numbers are bundled by dividing the same into four groups of i=0 to 3, 4 to 7, 8 to 11, and 12 to 15.

Through such a procedure, the channel numbers are divided into four groups of $g_1$={1, 5, 9, 13}, $g_2$={2, 6, 10, 14}, $g_3$={3, 7, 11, 15}, and $g_4$={4, 8, 12, 16}.

The bit-reversed order is characterized in that a difference between the i-th and the i+1 becomes the largest on average, and is suitable for creating a channel group having a frequency interval as far as possible.

Note that, in the embodiment, a similar result can be also obtained by sequentially selecting frequency channels at an interval of 20 MHz and creating a frequency group.

[Process of Sorting Frequency Groups in Bit-Reverse Order: FIG. 6]

Next, a process of sorting frequency groups in bit-reversed order for obtaining the above $g_1$, $g_2$, $g_3$, and $g_4$ is described with reference to FIG. 6. FIG. 6 is a flow chart of the process of sorting frequency groups in a bit-reversed order.

As illustrated in FIG. 6, i=0 and j=1 are set (S1). Here, i is a decimal number in the bit reverse map, and j is a number of a frequency group.

Next, a channel number corresponding to i is read from the bit reverse map (S2), and it is determined whether or not the frequency of the read channel is at least 20 MHz spacing from frequencies of all the channels within the j-th group $g_j$ (S3).

If the frequency of the read channel is at least 20 MHz spacing from frequencies of all the channels within the j-th group $g_j$ (i.e. If in the case of YES), the read channel is added to the j-th group $g_j$.

Then, i is incremented (i=i+1) (S5), and it is determined whether or not i is larger than "15" (i>15) (S6). If i>15 (in the case of Yes), the process is terminated, while if i≤15 (in the case of No), the process returns to Step 2.

Moreover, if the frequency of the read channel is not at least 20 MHz spacing from frequencies of all the channels within the j-th group $g_j$ (in the case of No), j is incremented (j=j+1) (S7), and then the process returns to Step 2 to generate the next group $g_j$.

[Creation of Small Hopping Table]

Subsequently, for each frequency group $g_1$, $g_2$, $g_3$, and $g_4$ characterized in that there is always at least 20 MHz interval between any two channels, a small hopping table is created.

In creating a small hopping table, the frequency channels within a group are arranged in an ascending order, the arranged frequency channels are read in bit-reversed order, and two channels are allocated to each phase. For example, with regard to group $g_1$, the four channels {1, 5, 9, 13} are associated with index numbers 0, 1, 2, 3 in ascending order, respectively. The index numbers 0, 1, 2, 3 are represented as "00", "01", "10", "11" in binary digits and as "00", "10", "01", "11" in bit-reversed order. Accordingly, in the bit-reversed order, the channels are provided as {1, 9, 5, 13}. Any two channels within a single group can be allocated to each phase. For example, {1, 13} may be one phase and {5, 9} may be another phase. By reading in bit-reversed order, the frequency channels can be designed so that the frequency interval of each phase becomes the largest on average.

The small hopping table created in this manner is as in Math.1 below. Note that, in the embodiment, the hopping table shall be expressed with a matrix, wherein each row of each matrix shall correspond to a hopping pattern and be periodically allocated in an arrangement order of each AP. For example, as illustrated in Math. 1, the first row provides the order pairs for each phase (e.g., [{1, 13} {5,9} ]) and the second row is the same order pairs of the first row, but switched (e.g., [{5,9} {1, 13} ]). As stated the hopping table can be periodically allocated in an arrangement order of each AP. In other words, a first row of matrix G1 can be allocated to a first AP and a second row of matrix G1 can be allocated to a second AP adjacent to the first AP.

Moreover, each column shall correspond to a phase, the phase shall be proceeded by one every time upstream and downstream transmission/reception is performed. A plurality of channels shall be allocated to each phase of each hopping patterns, AP and STA shall select one from among channels corresponding to a phase at each time point and communicate through this channel. The selection criteria is described later.

[MATH. 1]

$$G_1 = \begin{bmatrix} \{1,13\} & \{5,9\} \\ \{5,9\} & \{1,13\} \end{bmatrix}, G_2 = \begin{bmatrix} \{2,14\} & \{6,10\} \\ \{6,10\} & \{2,14\} \end{bmatrix}, \qquad (1)$$
$$G_3 = \begin{bmatrix} \{3,15\} & \{7,11\} \\ \{7,11\} & \{3,15\} \end{bmatrix}, G_4 = \begin{bmatrix} \{4,16\} & \{8,12\} \\ \{8,12\} & \{4,16\} \end{bmatrix}$$

These small hopping tables are characterized in that there is only one same frequency channel for each row and for each column.

Moreover, these small hopping tables are characterized also in that any two adjacent channels are always spacing from each other by at least 20 MHz.

Based on the thus created small hopping tables $G_1$, $G_2$, $G_3$, and $G_4$, a hopping table actually used in the system is created by connecting these small tables.

Therefore, one group can be used for each continuous transmission, and within an identical continuous transmission, channels spacing from each other by at least 20 MHz can be used in continuous two times of transmission, and sufficient frequency diversity can be obtained even against interference from wireless LANs.

Hereinafter, an example of the hopping table is illustrated by classifying cases based on a relationship with other CBTC system.

[(1) Case Where There is Only its Own System and No Other Adjacent System]

When there is only its own system and no other adjacent system, for example a hopping table T as in Math.2 may be created using the small hopping tables $G_1$, $G_2$, $G_3$, and $G_4$.

[MATH. 2]

$$T = [\, G_1 \; G_2 \; G_3 \; G_4 \,] = \qquad (2)$$
$$\begin{bmatrix} \{1,13\} & \{5,9\} & \{2,14\} & \{6,10\} & \{3,15\} & \{7,11\} & \{4,16\} & \{8,12\} \\ \{5,9\} & \{1,13\} & \{6,10\} & \{2,14\} & \{7,11\} & \{3,15\} & \{8,12\} & \{4,16\} \end{bmatrix}$$

The hopping table T is characterized in that there is only one channel for each row and for each column, and thus 16 channels can be uniformly used and therefore interference to systems other than the CBTC system can be reduced.

[(2) Case Where There are Two to Four CBTC Systems Adjacent to Each Other and Their Phases are in Synchronization with Each Other]

When there are two to four CBTC systems adjacent to each other and their phases are in synchronization with each other, a hopping table, as in Math.3 to Math.6 below, formed by cyclically shifting the hopping table T in the unit of each group (small hopping table) is defined, and allocated to each system. Thus, up to four systems can coexist without causing interference.

Hopping table of System 1: $T^{(1)}$

[MATH. 3]

$$T^{(1)} = [\, G_1 \; G_2 \; G_3 \; G_4 \,] = \qquad (3)$$
$$\begin{bmatrix} \{1,13\} & \{5,9\} & \{2,14\} & \{6,10\} & \{3,15\} & \{7,11\} & \{4,16\} & \{8,12\} \\ \{5,9\} & \{1,13\} & \{6,10\} & \{2,14\} & \{7,11\} & \{3,15\} & \{8,12\} & \{4,16\} \end{bmatrix}$$

Hopping table of System 2: $T^{(2)}$

[MATH. 4]

$$T^{(2)} = [\, G_2 \; G_3 \; G_4 \; G_1 \,] = \qquad (4)$$
$$\begin{bmatrix} \{2,14\} & \{6,10\} & \{3,15\} & \{7,11\} & \{4,16\} & \{8,12\} & \{1,13\} & \{5,9\} \\ \{6,10\} & \{2,14\} & \{7,11\} & \{3,15\} & \{8,12\} & \{4,16\} & \{5,9\} & \{1,13\} \end{bmatrix}$$

Hopping table of System 3: $T^{(3)}$

[MATH. 5]

$$T^{(3)} = [\, G_3 \; G_4 \; G_1 \; G_2 \,] = \qquad (5)$$
$$\begin{bmatrix} \{3,15\} & \{7,11\} & \{4,16\} & \{8,12\} & \{1,13\} & \{5,9\} & \{2,14\} & \{6,10\} \\ \{7,11\} & \{3,15\} & \{8,12\} & \{4,16\} & \{5,9\} & \{1,13\} & \{6,10\} & \{2,14\} \end{bmatrix}$$

Hopping table of System 4: $T^{(4)}$

[MATH. 6]

$$T^{(4)} = [\, G_4 \; G_1 \; G_2 \; G_3 \,] = \qquad (6)$$
$$\begin{bmatrix} \{4,16\} & \{8,12\} & \{1,13\} & \{5,9\} & \{2,14\} & \{6,10\} & \{3,15\} & \{7,11\} \\ \{8,12\} & \{4,16\} & \{5,9\} & \{1,13\} & \{6,10\} & \{2,14\} & \{7,11\} & \{3,15\} \end{bmatrix}$$

[(3) Case Where There are Two CBTC Systems Adjacent to Each Other and Their Phases are Not in Synchronization with Each Other]

When there are two CBTC systems adjacent to each other and their phases are not in synchronization with each other, from among the small hopping tables $G_1$ to $G_4$ two hopping tables are allocated to the system, respectively, and hopping tables, for example, as in Math.7 and Math.8 are used.

Specifically, for two CBTC systems, a first hopping table is generated by connecting a half of the small hopping tables $G_1$ to $G_4$ and a second hopping table is generated by connecting the rest half of the hopping tables, so that the respective systems use different hopping tables.

Hopping table of System 1: $T^{(1)}$

[MATH. 7]

$$T^{(1)} = [\, G_1 \; G_3 \,] = \begin{bmatrix} \{1,13\} & \{5,9\} & \{3,15\} & \{7,11\} \\ \{5,9\} & \{1,13\} & \{7,11\} & \{3,15\} \end{bmatrix} \qquad (7)$$

Hopping table of System 2: $T^{(2)}$

[MATH. 8]

$$T^{(2)} = [\, G_2 \; G_4 \,] = \begin{bmatrix} \{2,14\} & \{6,10\} & \{4,16\} & \{8,12\} \\ \{6,10\} & \{2,14\} & \{8,12\} & \{4,16\} \end{bmatrix} \qquad (8)$$

[(4) Case Where There are Three or Four CBTC Systems Adjacent to Each Other and Their Phases are Not in Synchronization with Each Other]

When there are three or four CBTC systems adjacent to each other and their phases are not in synchronization with each other, one of the small hopping tables G1 to G4 is allocated to each system, respectively, and is used as it is.

Hopping table of System 1: $T^{(1)}=G_1$
Hopping table of System 2: $T^{(2)}=G_2$
Hopping table of System 3: $T^{(3)}=G_3$
Hopping table of System 4: $T^{(4)}=G_4$ As described above, using a hopping table created based on frequency groups, a hopping pattern is allocated to each AP. For example, when $T=[G_1\ G_2\ G_3\ G_4]$ is used as a hopping table, a pattern is repetitively allocated in an order arranged along a track, such as that the first row is allocated to AP 201, the second row to AP 202, and the first row to AP 203.

Using the thus allocated hopping patterns, a frequency channel to use is determined according to a phase cyclically indicated from APM.

[Selection of Frequency Channel]

Hereinafter, a method of selecting one frequency channel from a plurality of frequency channels allocated to each phase is described.

Selection of a frequency channel is performed with reference to a hopping table by AP where information on communication quality is obtained, but if the information on communication quality is transmitted to APM, APM may select a frequency channel and transmit the selected result to AP.

For selection of a channel, a channel having better communication quality is determined and this channel is used. Moreover, when the communication quality is comparable with each other in order to uniformly use 16 channels as much as possible for the purpose of minimizing interference to other system, a channel with a smaller number of times of use in the past is used.

As the criteria of communication quality, a history of a bit error rate, a history of a packet error rate, a history of SINR, an instant interference power by carrier sensing, or the like may be used.

Information, such as the history of a bit error rate, and the history of a packet error rate, and the history of SINR can be obtained by STA, in transmitting positional information to AP in addition to the information based on a reception result by AP itself, returning the reception result to AP as well.

Moreover, the instant interference power can be obtained by AP sensing an interference power by carrier sensing before starting to transmit in each slot.

Furthermore, if the system did not succeed in transmission even once in certain continuous transmission, then in the next continuous transmission, a frequency channel that is the furthest from a frequency CH that was used in the last continuous transmission is used. In this manner, down of a train control system due to a continuous failure in communication can be avoided as much as possible.

With the frequency hopping system as described above, frequency hopping can be realized, wherein up to four systems can coexist while avoiding intra-system interference, inter-system interference, interference from a wireless LAN, and interference to other systems.

Effect of Embodiment

According to this wireless communication system, the APM (401) provides sequential numbers to channels formed by dividing a specific frequency band, selects the channels in a bit-reversed order of the numbers and divides the same into frequency groups, creates a small hopping table for each frequency group, generates a hopping table using the plurality of small hopping tables, and an AP performs channel access on an STA by frequency hopping with reference to this hopping table, and there are therefore effects of avoiding intra-system interference, inter-system interference, and interference from a wireless LAN and achieving high quality wireless communication.

INDUSTRIAL APPLICABILITY

The present invention is preferable for a high quality wireless communication system capable of avoiding intra-system interference, inter-system interference, and interference from a wireless LAN.

REFERENCE SIGNS LIST

101 . . . track,
102 . . . train,
103 . . . backbone network,
201, 202, 203 . . . base station (AP),
301, 302 . . . mobile station (STA),
401 . . . centralized control apparatus (APM),
402 . . . host system (command system),
501 . . . antenna,
502 . . . RF unit (wireless unit),
503 . . . BB (baseband) signal processing unit,
504 . . . MAC processing unit,
505 . . . storage unit,
506 . . . main control unit,
507 . . . interface unit

The invention claimed is:

1. A wireless communication system comprising: a plurality of base stations; a mobile station moving within a communications area of the base station; and a base station control unit controlling the base station, wherein
    the base station and the mobile station perform continuous transmission wherein transmission of identical information is repeated multiple times, wherein
    the base station stores a hopping table for generating a hopping pattern into a storage unit, and performs channel access by frequency hopping with respect to the mobile station using this hopping table, and wherein
    the base station control unit provides sequential numbers to channels formed by dividing a specific frequency band, selects the channels in a bit-reversed order of the numbers and divides the same into frequency groups, creates a small hopping table for each frequency group, generates a hopping table using the plurality of small hopping tables, and transmits this hopping table to the base station, wherein for the small hopping table for each frequency group, two channels are allocated to each phase of each hopping pattern.

2. The wireless communication system according to claim 1, wherein when there is only the wireless communication system itself and no other adjacent system, the base station control unit generates a hopping table by connecting a plurality of small hopping tables.

3. The wireless communication system according to claim 1, wherein when there are a plurality of wireless communication systems adjacent to each other and their phases are in synchronization with each other, the base station control unit generates a plurality of hopping tables by cyclically shifting a plurality of small hopping tables, and uses different tables among the plurality of systems.

4. The wireless communication system according to claim 1, wherein when there are two wireless communication systems adjacent to each other and their phases are not in synchronization with each other, the base station control unit generates a first hopping table by connecting a half of a plurality of small hopping tables, generates a second hopping table by connecting the rest half of the hopping tables, and uses different tables among the two systems.

5. The wireless communication system according to claim 1, wherein when there are at least three wireless communication systems adjacent to each other and their phases are not in synchronization with each other, the base station control unit generates at least three hopping tables by selecting different small hopping tables from among a plurality of small hopping tables, and uses different tables among the at least three systems.

6. The wireless communication system according to claim 1, wherein the base station selects a frequency channel based on information on communication quality, with reference to a stored hopping table.

7. The wireless communication system according to claim 2, wherein the base station selects a frequency channel based on information on communication quality, with reference to a stored hopping table.

8. The wireless communication system according to claim 3, wherein the base station selects a frequency channel based on information on communication quality, with reference to a stored hopping table.

9. The wireless communication system according to claim 4, wherein the base station selects a frequency channel based on information on communication quality, with reference to a stored hopping table.

10. The wireless communication system according to claim 5, wherein the base station selects a frequency channel based on information on communication quality, with reference to a stored hopping table.

11. A mobile station used in a wireless communication system in which a base station performs channel access by frequency hopping, the mobile station receiving a signal that is subjected to frequency hopping for each slot by continuous transmission wherein identical information is repeatedly transmitted twice through two slots, and transmitting its own information to the base station in a frequency channel in accordance with a hopping table stored in a storage unit, wherein a relevant hopping table is generated by providing sequential numbers to channels formed by dividing a specific frequency band, selecting the channels in a bit-reversed order of the numbers and dividing the same into frequency groups, creating a small hopping table for each frequency group such that two channels are allocated to each phase of each hopping pattern, and using the plurality of small hopping tables.

* * * * *